(12) United States Patent
Fishel et al.

(10) Patent No.: US 10,117,543 B2
(45) Date of Patent: Nov. 6, 2018

(54) DISPOSABLE BAKING PAN WITH DETACHABLE BAKING PAPER

(71) Applicants: Shmuel Fishel, Beney Berak (IL); Abraham Natan Bar On, Hashmonaim (IL); Alexsander Shmuel Bar On, Jerusalem (IL)

(72) Inventors: Shmuel Fishel, Beney Berak (IL); Abraham Natan Bar On, Hashmonaim (IL); Alexsander Shmuel Bar On, Jerusalem (IL)

( * ) Notice: Subject to any disclaimer, the term of this patent is extended or adjusted under 35 U.S.C. 154(b) by 0 days.

(21) Appl. No.: 14/910,038

(22) PCT Filed: Aug. 8, 2013

(86) PCT No.: PCT/IL2013/050673
§ 371 (c)(1),
(2) Date: Feb. 4, 2016

(87) PCT Pub. No.: WO2015/019338
PCT Pub. Date: Feb. 12, 2015

(65) Prior Publication Data
US 2016/0157671 A1 Jun. 9, 2016

(51) Int. Cl.
*A47J 36/02* (2006.01)
*A47J 27/00* (2006.01)
(Continued)

(52) U.S. Cl.
CPC ............ *A47J 36/022* (2013.01); *A47J 27/00* (2013.01); *A47J 27/04* (2013.01); *A47J 36/06* (2013.01); *A47J 37/01* (2013.01)

(58) Field of Classification Search
CPC ........................................... A47J 36/022
(Continued)

(56) References Cited

U.S. PATENT DOCUMENTS 3,453,949 A * 7/1969 Levin .................... A47J 36/022
99/446
3,724,711 A * 4/1973 George ................. A47J 36/022
220/573.1
(Continued)

FOREIGN PATENT DOCUMENTS

CA 2468166 A1 12/2005
CN 201263362 Y 7/2009
(Continued)

OTHER PUBLICATIONS

International Search Report issued in a corresponding application PCT/IL2013/050673 dated Nov. 5, 2013.
(Continued)

*Primary Examiner* — Stephen Castellano
(74) *Attorney, Agent, or Firm* — Dr. Hanan Farber Patent Agent Ltd.

(57) ABSTRACT

Provided is a baking set including a disposable baking pan and a corresponding detachable baking paper. The components of the baking set can be used together for cooking and serving purposes or they can be used separately. When used together as a set, after use, the user can either dispose of the set or detach the baking paper from the disposable baking pan to reuse the disposable baking pan. The baking set may further include another baking paper which may serve as a lid for steam cooking by attaching the baking paper upside down over the baking pan.

4 Claims, 7 Drawing Sheets

(51) Int. Cl.
*A47J 36/06* (2006.01)
*A47J 37/01* (2006.01)
*A47J 27/04* (2006.01)

(58) Field of Classification Search
USPC ..................................................... 220/62.13
See application file for complete search history.

(56) References Cited

U.S. PATENT DOCUMENTS

| | | | |
|---|---|---|---|
| 5,721,022 | A | 2/1998 | Morita et al. |
| 6,869,059 | B2 | 3/2005 | Sloan et al. |
| 6,905,017 | B1 | 6/2005 | Sarnoff et al. |
| 7,163,120 | B1 | 1/2007 | Blucher |
| 2005/0013951 | A1* | 1/2005 | Mitchell ............... A47J 36/022 428/34.2 |
| 2005/0211101 | A1 | 9/2005 | Finnie, II |
| 2011/0031375 | A1 | 2/2011 | Powell |
| 2013/0161337 | A1 | 6/2013 | Skopis |

FOREIGN PATENT DOCUMENTS

| | | |
|---|---|---|
| DE | 202008016647 U1 | 3/2009 |
| EP | 1043247 A1 | 10/2010 |
| JP | 2010207117 A | 9/2010 |
| WO | 01/54994 A1 | 8/2001 |

OTHER PUBLICATIONS

Supplementary European Search Report for corresponding European Patent Application No. 13891296 dated Feb. 1, 2017.
Julie R. Thomson, The Difference Between Parchment Paper and Wax Pater, and When You Use Which, Huffington Post, Sep. 19, 2017.
Parchment Paper, Wikipedia.com.

* cited by examiner

DISPOSABLE BAKING PAN WITH DETACHABLE BAKING PAPER

CROSS-REFERENCE TO RELATED APPLICATIONS

The present application is a U.S. National Phase of PCT/IL2013/050673 filed on Aug. 8, 2013, the disclosure of which is hereby incorporated by reference into the present Application.

FIELD OF THE INVENTION

The present invention is related to the field of disposable pans; more specifically but not exclusively, the invention may be applied to the field of disposable baking pans having a baking paper layer.

BACKGROUND OF THE INVENTION

Baking panes come in a variety of shapes and sizes, disposable baking pans are often used for baking and serving foods. As most of the disposable pans are made of aluminum, other disposable pans are sometimes made by partial or by totally recyclable material such as cured cardboards. Although disposable baking pans are designed for cooking purposes, they are often used as trays for serving foods whether hot or cold.

Baking paper is sometimes referred to by the art as baking parchment is often used to eliminate the need to grease the pans in order to prevent the food from sticking to the pans. Modern baking paper is made by paper rolls rolling through a bath of sulfuric acid or zinc chloride. This process yields a sulfurized cross-linked material with properties such as; high density, stability, and heat resistance, thus having a non-stick quality. Alternatively, the non-stick quality can be obtained by coating a paper with a suitable agent such as silicone having a low surface energy and the capability to withstand high temperatures. Although baking paper can be also used as a wax paper for wrapping sandwiches for example, wax paper cannot be used as baking paper as it lacks the quality to withstand high temperatures. Baking paper is sometimes used for steaming or cooking within closed pouches made from the baking paper itself, a technique which is sometimes referred to as en papillote cooking. Baking paper is usually purchased by the consumer in rolls or in pre-cut rectangle, thereby requiring the user to cut or to fold the baking paper to fit the pan in which it is to be used. Folding the baking paper may be quite tricky as it is somewhat shape remembering material. Some attempts have been made to facilitate the baking procedures associated with baking papers.

U.S. Pat. No. 5,721,022 to MORITA teaches of two types of disposable pans made from a paper sheet material by press means, particularly designed to prevent its paper configuration from easily deforming or to prevent its bottom portion from easy burning. In order to prevent the paper configuration from deforming, a plurality of folds are provided on the opening divergent part to have the overlapped width small, and/or a synthetic resin is laminated on said paper sheet material. In order to prevent the bottom portion from easily burning, the inner upper surface of said bottom portion is provided with one or plural projections, a metallic foil or sheet is laminated on the outer back surface of said bottom portion, and/or the paper sheet material is impregnated with a surface active agent or the like.

Japanese patent application JP2010207117 to KEI teaches a process for making a baking paper for preventing the inner surface of a container from directly contacting bread dough, and having a glazed surface with a treating agent for easy peeling off from the formed bread after the maturing treatment.

U.S. Pat. No. 7,163,120 to BLUCHER teaches of an apparatus, system, and method for forming an improved barrier between a pan and a substance, such as food, contained therein using a contour fit pan liner. The apparatus includes a pan liner having a contoured bottom edge that is custom fit within a food service pan to cover an interior surface of the pan. The contoured edge of the pan liner conforms to the shape and size of the food service pan and does not have any dog ears, ears, or tails that are typical of conventional pan liner. The liner is disposed within the food receptacle area of the pan to cover the interior surface of the pan and the top of the liner is folded over the top opening of the pan.

The invention hereof improves some of the needs associated with baking containers.

SUMMARY OF THE INVENTION

The invention hereof discloses a disposable baking set made by press means, the disposable baking set may comprise a disposable baking pan and a corresponding baking paper detachably attached to it. The detachable attachment may be achieved merely by placing the disposable baking paper on top of the baking pan or by using a soft adhesive to ensure simple manual detachment of the baking paper form the baking pan if so required. The adhesive may be based on edible material to refrain from an adverse effect should the food come in contact with the remains of the adhesive after detaching the baking paper and reusing the disposable baking pan without the baking paper.

Few disposable baking sets may be nested one inside of the other to reduce space while shipping and storing a stack of the disposable baking sets.

The disposable baking pan may include sealing lips to enable manual attachment of a lid to the disposable baking pan. The lid may also be made by baking paper thus enabling steam cooking. The baking paper lid may be substantially in the shape of the baking paper which corresponds to the shape of the baking pan and nests inside the baking pan when not in use. The baking paper lid can be detached from the baking pan or the baking paper over which it rests and placed upside down on top of the baking pan, the baking paper lid can then be manually attached to the baking pan by the baking pan's attachment lips.

The disposable baking set may come in a variety of shapes and sizes and may include a few cupcake shaped cavities for baking cupcakes.

The disposable baking paper may further include precut slits for manually detaching predesigned shapes from the baking paper, thus eliminating the needs to; use scissors or other cutting means, sizing up the required shaped to be cut from the baking paper and shaping the baking paper to try and fit the disposable pan.

The invention hereof discloses a method for using a set of a disposable baking pan and a detachably attached corresponding disposable baking paper, the method may comprise the following steps:

a) placing food on the disposable baking set on the surface of the disposable baking paper; cooking or serving the food via the disposable baking set; and b) disposing the disposable baking set after the use; or alternatively c) detaching the detachably attached baking paper from the baking pan; and d) reusing the disposable baking pan.

DETAILED DESCRIPTION OF THE INVENTION

For a better understanding of the invention and to show how the same may be carried into effect, reference will now be made, purely by way of example, to the accompanying drawings. With specific reference to the drawings in detail, it is stressed that the particulars shown are by way of example and for purposes of illustrative discussion of preferred embodiments of the present invention only, and are presented for the purpose of providing what is believed to be the most useful and readily understood description of the principles and conceptual aspects of the invention. In this regard, no attempt is made to show structural details of the invention in more detail than is necessary for a fundamental understanding of the invention. From the description taken together with the drawings it will be apparent to those skilled in the art how the several forms of the invention may be embodied in practice. Moreover, it is to be understood that the phraseology and terminology employed herein is for the purpose of description and should not be regarded as limiting the scope of the invention hereof.

Figure 1:
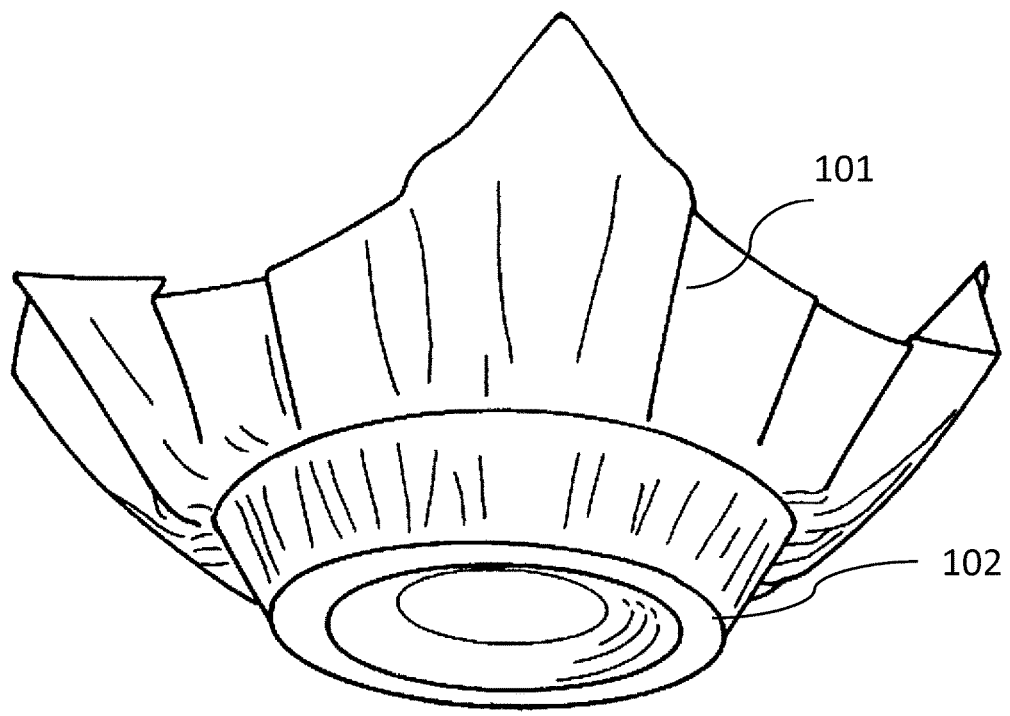
FIG. 1 schematically shows a disposable pan depicted by the prior art.

FIG. 1 schematically shows a disposable pan depicted by the prior art. U.S. Pat. No. 5,721,022 to MORITA teaches of a disposable pan 101 made from a paper sheet material and form a paper having a plurality of wrinkles 102.

Figure 2:
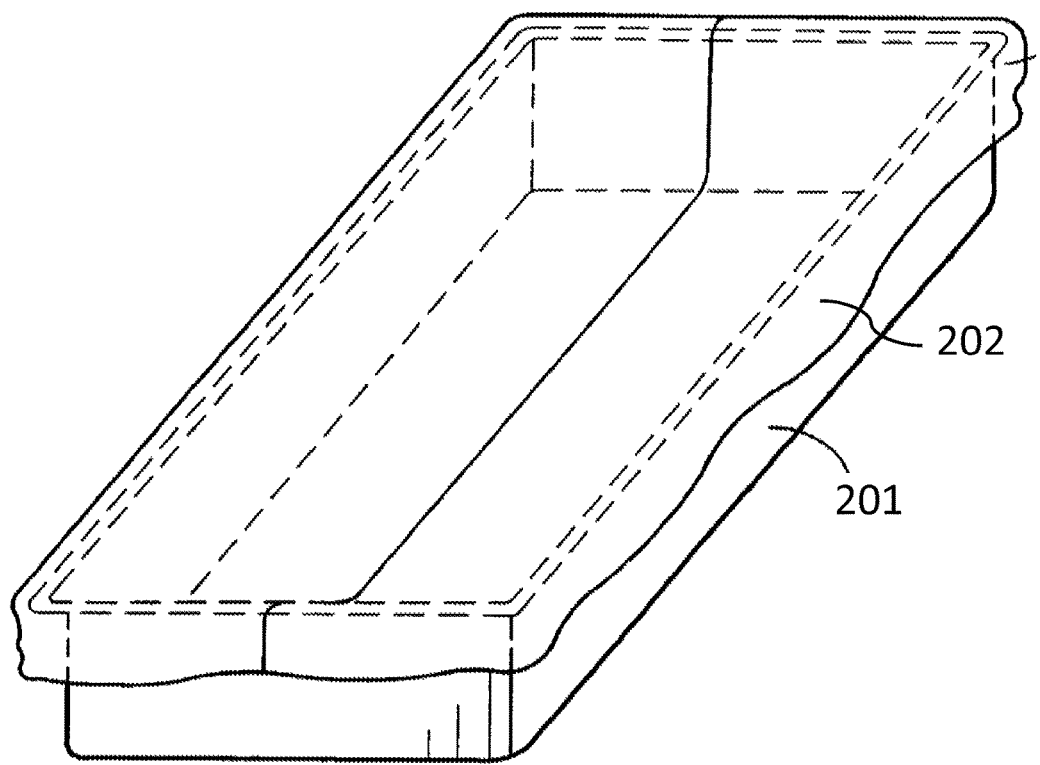
FIG. 2 schematically shows an apparatus for forming an improved barrier between a pan and food as depicted by the prior art.

FIG. 2 schematically shows an apparatus for forming an improved barrier between a pan and food as depicted by the prior art. U.S. Pat. No. 7,163,120 to BLUCHER teaches of an apparatus, system, and method for forming an improved barrier between a pan 201 and a food substance by a plastic liner 202.

Figure 3:
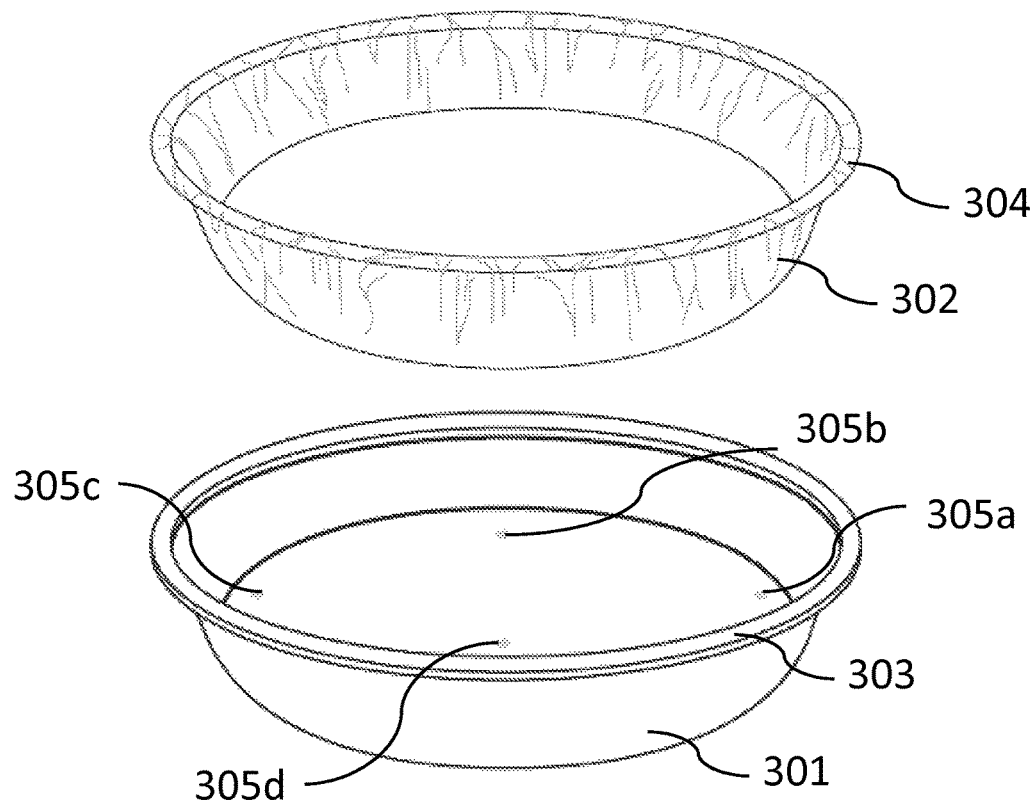
FIG. 3 schematically shows a perspective view of a disposable pan with a detachable corresponding baking paper.

FIG. 3 schematically shows a perspective view of a disposable pan 301 with a detachable corresponding disposable baking paper 302. Disposable pan 301 and disposable baking paper 302 have corresponding lips 303 and 304 respectively. Disposable pan 301 and disposable baking paper 302 are attached by an adhesive applied to a few areas 305a, 305b, 305c, 305d of disposable pan 301 before disposable baking paper 302 is placed over it during the manufacturing process. The adhesive 305a-305d is applied to merely hold the baking paper in place and to assist separating a set of a disposable pan 301 with the disposable baking paper 302 from a nested stack of such sets as further depicted in FIG. 6. The adhesive 305a-305d is based on an edible material based on Tylos powder for example. The adhesive can alternatively be sprayed, smeared or applied any other way to the surface, to the sides or to the lips of the disposable container to hold the disposable baking paper 302 in place. The use of a disposable pan 301 together with a corresponding disposable baking paper 302 as a set simplifies the need to cut the disposable baking paper from a roll trying to fold it and to fit it to the contour of a disposable pan. Moreover, the detachability of the baking paper 302 from the disposable pan 301 allows one to use the disposable pan 301 not once but twice.

That is, the disposable pan can be used once with the baking paper 302 and then again after detaching the baking paper 302 from the disposable pan 301. Because the edible adhesive 305a-305d is attached softly to the disposable pan 302 one can simply peel-off the baking paper 302 from the disposable pan 301 to allow another use of the disposable pan 301. The edible adhesive 305a-305d ensures that remains of the edible adhesives 305a-305d over the disposable pan 301 after the disposable baking paper 302 had been peeled-off will not have an adverse effect when coming in direct contact with food placed on the disposable pan 302 during the second use. The disposable pan 301 is made by aluminum; alternatively, the disposable pan 301 can be made by other materials such as paper.

Figure 4A:
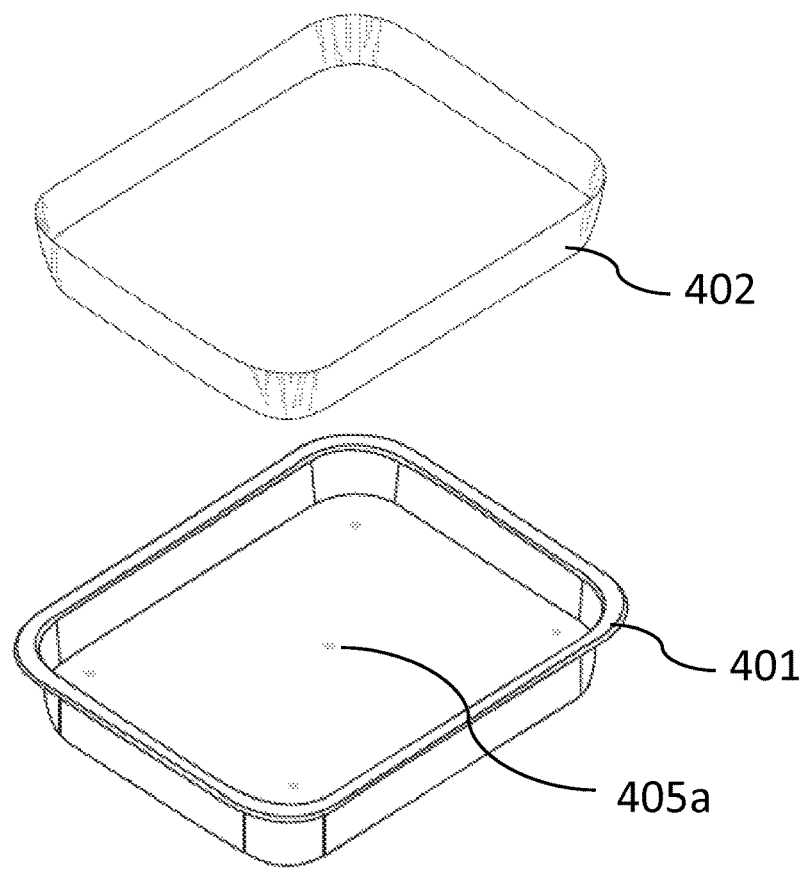
FIG. 4a and FIG. 4b schematically shows a perspective view of a disposable pan with a corresponding baking paper and a baking paper lid.
Figure 4B:
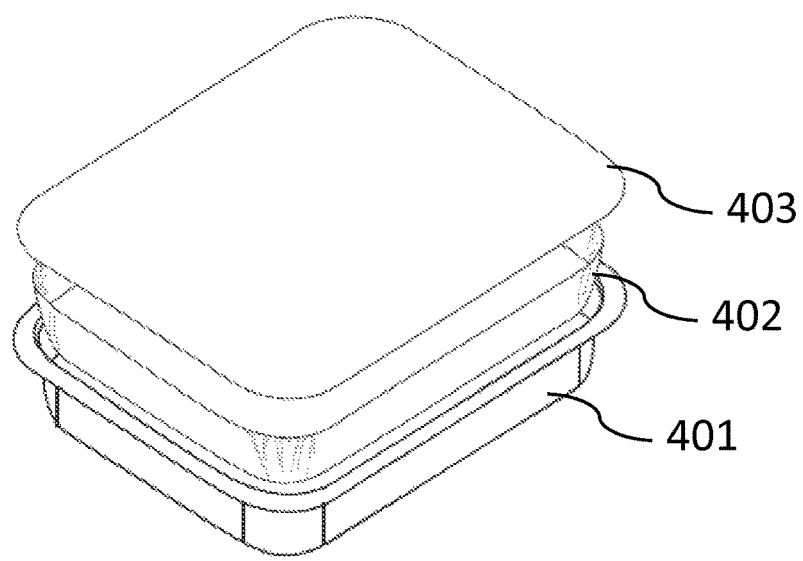

FIG. 4a and FIG. 4b schematically shows a perspective view of a disposable pan 401 with a corresponding disposable baking paper 402 and a corresponding disposable baking paper lid 403. The disposable pan 402 includes a lip with a vertical contour 404 to allow manual attachment of the disposable baking paper lid 403 to the disposable baking pan 401 if so desired. The attachment of the disposable baking paper lid 403 can be used for steam cooking, sometimes also referred to as en papillote cooking. In this configuration, the food does not come in contact with the disposable pan 401 at all. After the cooking, the user can choose whether to detach the baking paper 402 which is attached to the baking pan by a soft edible adhesive 405 and to reuse the baking pan 401 or to dispose the disposable baking pan 401 along with the disposable baking paper 402 and the disposable baking paper lid 403. The disposable baking paper lids can be provided with the set of the disposable baking pans with the disposable baking papers or can be provided as a separate stack or manually cut from a baking paper roll. The disposable baking paper pans and their corresponding disposable baking papers and lids can come in variable shapes and sizes, with or without lips and with or without a lip having a vertical contour for attaching a lid.

Figure 5A:
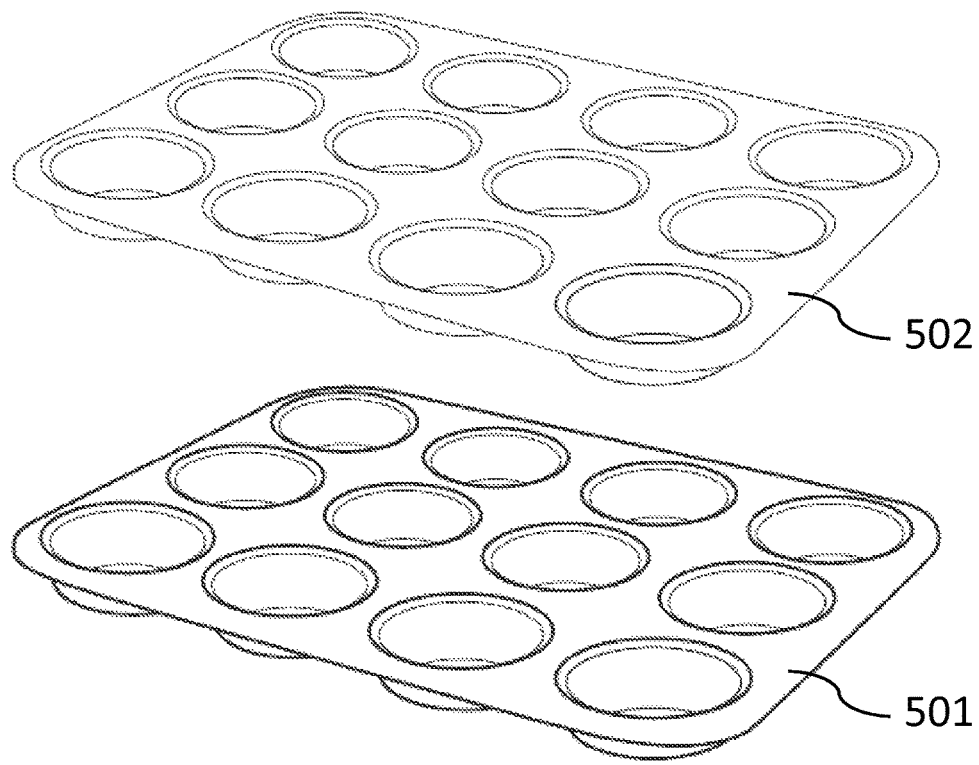
FIG. 5a and FIG. 5b schematically shows a perspective view of a disposable cupcake pan with a corresponding baking paper having partial precuts in the forms of the cupcakes.
Figure 5B:
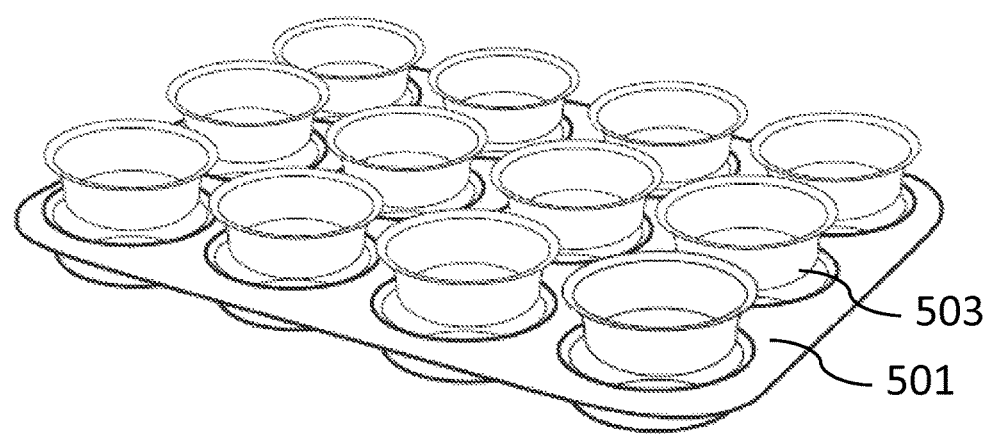

FIG. 5a and FIG. 5b schematically shows a perspective view of a disposable cupcake pan 501 with a corresponding disposable baking paper 502 having partial precuts in the forms of the cupcakes. The disposable baking paper 502 includes a plurality of cavities which are achieved by a press during the manufacturing process. The disposable baking paper 502 can be attached with a soft heat resistant adhesive to the baking pan 501 or alternatively, placed inside the baking pan 501 without an adhesive, the corresponding cavities between the baking pan 501 and the baking paper 502 will ensure that the baking paper 501 is kept in place. Detaching the baking paper 502 form the baking pan 501 after cooking is much simpler due to the fact that the baking paper 502 is made by a single paper sheet rather than precut cupcake shaped baking papers which are sometimes used. Moreover, detachment of the cupcakes after cooking from the single baking paper 502 sheet is also much simpler due to the same reason. FIG. 5b depicts a set of precut cupcake shaped baking papers 503 which come as a set inside a disposable baking pan 501, alternatively, the baking paper single sheet 502 can have precut slits around each cavity to allow detachment of individual cupcake shaped baking papers 503 as required.

Figure 6A:
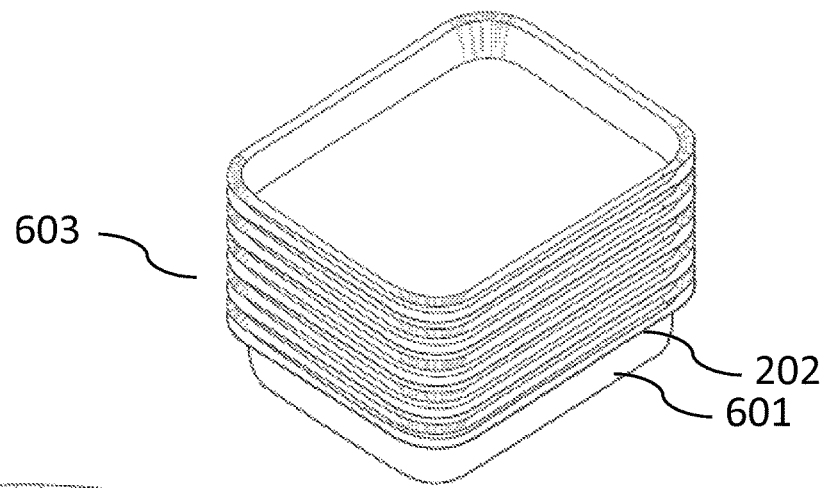
FIG. 6a-FIG. 6c schematically shows a perspective view of sets of disposable pans with corresponding baking paper nesting one inside of the other.
Figure 6B:
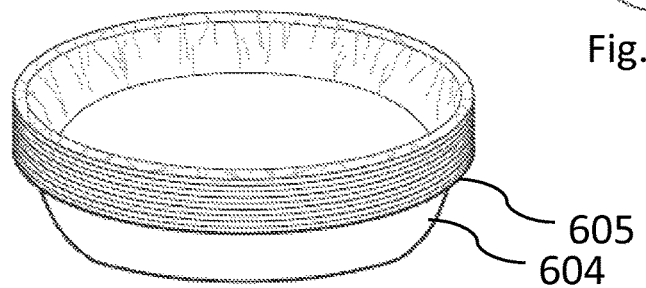
Figure 6C:
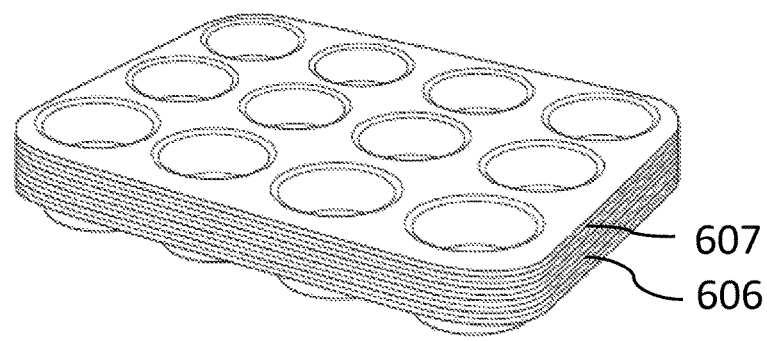

FIG. 6a-FIG. 6c schematically shows a perspective view of sets of disposable pans with corresponding baking paper nesting one inside of the other. Disposable baking trays made of aluminum 601 and having a corresponding disposable baking paper 602 attached to them are provided as sets nested one inside of the other 603. The nesting of the sets facilitated shipping and storing of large numbers of the disposable pans and liners. In addition, the nesting also ensures that each baking paper is kept in place inside its corresponding baking pan without the need to use adhesives or alternative attachment means. FIG. 6b depicts disposable paper pans 604 with corresponding disposable baking papers 605 nested one inside of the other. FIG. 6c depicts disposable cupcakes paper pans 606 with corresponding disposable cupcake shaped single baking paper sheets 607 nested one inside of the other.

Figure 7A:
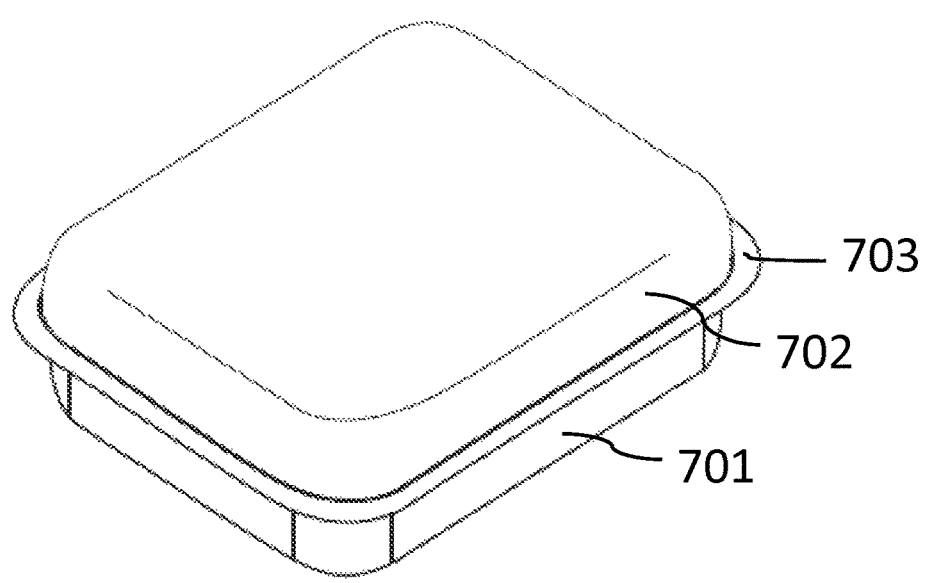
FIG. 7a and FIG. 7b schematically shows a perspective view of disposable pans having two corresponding disposable backing papers one of which serves as a lid when attached upside down to the disposable pan.
Figure 7B:
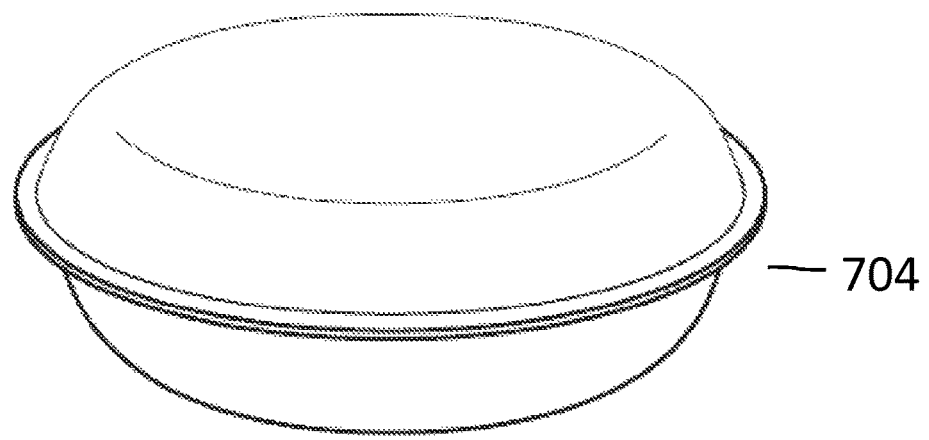

FIG. 7a and FIG. 7b schematically shows a perspective view of disposable pans having two corresponding disposable backing papers one of which serves as a lid when attached upside down to the disposable pan. Disposable pan 701 comes as a set with two corresponding disposable baking papers, one of the disposable baking papers (not shown) is attached on to the disposable baking pan 701 and the other disposable baking paper 702 is turned upside down and attached as a lid to the disposable baking pan 701 via a lip with a vertical contour 703 to allow manual attachment of the disposable baking paper lid 702 to the disposable baking pan 701. The attachment of the disposable baking paper lid 702 can be used for steam cooking, sometimes also referred to as en papillote cooking. In this configuration, the food does not come in contact with the disposable pan 701 at all. After the cooking, the user can choose whether to detach the baking paper which is attached to the baking pan 701 by a soft edible adhesive (as depicted in FIG. 4) and to reuse the baking pan 701 or to dispose the disposable baking pan 701 along with the disposable baking paper (not shown) and the disposable baking paper lid 702. FIG. 7b depicts a rounded shaped disposable baking pan 704 with a set of two corresponding disposable baking papers as depicted in FIG. 7a mutatis mutandis.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A disposable baking set, comprising:
   a) a disposable baking pan comprising:
      a pan lip;
      a surface; and
      one or more sidewalls; and
   b) a disposable baking paper comprising:
      a surface corresponding to the surface of the disposable baking pan;
      a lip;
   one or more side walls corresponding to the one or more sidewalls of the disposable baking pan; and
      a shape corresponding to a shape of the disposable baking pan,
      wherein the disposable baking paper is disposed on and pressed to the disposable baking pan so that the surface and the one or more said side walls of the disposable baking paper covers the surface and the one or more sidewalls of the baking pan, and
   wherein said baking paper constitutes an uppermost surface and is arranged so as to contact a food when the food is placed in the baking set, wherein the baking paper further comprises precut slits for manually detaching predesigned shapes from the baking paper.

2. The disposable baking set according to claim 1, wherein the baking paper lip is mounted on the pan lip.

3. The disposable baking set according to claim 1, wherein the disposable baking paper is manually detachable from the disposable baking pan.

4. The disposable baking set according to claim 1, further comprising a soft, heat resistant adhesive attaching the disposable baking paper to the disposable baking pan.

* * * * *